United States Patent [19]

Duncan

[11] Patent Number: 4,701,369

[45] Date of Patent: Oct. 20, 1987

[54] OPAQUE POLYMER FILM LAMINATE HAVING AN ABSORBENT SURFACE

[75] Inventor: Gary L. Duncan, Fairport, N.Y.

[73] Assignee: Mobil Oil Corporation, New York, N.Y.

[21] Appl. No.: 854,963

[22] Filed: Apr. 23, 1986

[51] Int. Cl.$^4$ ............................ B32B 3/26; B32B 7/00
[52] U.S. Cl. .................... 428/313.9; 156/229; 264/210.7; 428/315.5; 428/316.6; 428/317.9; 428/321.1; 428/321.3; 428/323; 428/910; 428/913
[58] Field of Search .............. 156/229; 264/210.7; 428/313.3, 313.5, 313.9, 315.5, 315.7, 315.9, 316.6, 317.9, 323, 325, 327, 328, 910, 913, 321.1, 321.3

[56] References Cited

U.S. PATENT DOCUMENTS

| | | | |
|---|---|---|---|
| 4,377,616 | 3/1983 | Ashcraft et al. | 428/315.7 |
| 4,438,175 | 3/1984 | Ashcraft et al. | 428/317.9 |
| 4,496,620 | 1/1985 | Park et al. | 428/323 |
| 4,560,614 | 12/1985 | Park | 428/317.9 |
| 4,578,297 | 3/1986 | Duncan | 428/317.9 |
| 4,582,736 | 4/1986 | Duncan | 428/317.9 |
| 4,582,752 | 4/1986 | Duncan | 428/317.9 |
| 4,582,753 | 4/1986 | Duncan | 428/313.3 |
| 4,626,460 | 12/1986 | Duncan | 428/317.9 |
| 4,632,869 | 12/1986 | Park et al. | 428/317.9 |

*Primary Examiner*—William J. Van Balen
*Attorney, Agent, or Firm*—Alexander J. McKillop; Michael G. Gilman; Charles J. Speciale

[57] ABSTRACT

An oriented, opaque polymer film laminate which comprises:

(a) a non-absorbent thermoplastic polymer core layer having an upper major surface and a lower major surface; and, (b) a liquid-absorbent, opaque surface layer adherently applied to the upper major surface of the core layer and, optionally, to the lower major surface of the core layer, said surface layer comprising a thermoplastic matrix polymer containing numerous opaquing voids, said voids containing one or more void-initiating particles derived from a material which is phase distinct and incompatible with the matrix material.

31 Claims, No Drawings

OPAQUE POLYMER FILM LAMINATE HAVING AN ABSORBENT SURFACE

BACKGROUND OF THE INVENTION

The present invention relates to a polymer film laminate and, in particular, to such a laminate which is opaque and which possesses at least one major surface capable of absorbing liquid media.

Cellulosic papers and other types of fibrous webs, including the woven and non-woven varieties, fabricated from non-cellulosic polymeric materials such as the polyolefins, polyamides, polyesters, and the like, are currently the materials of choice for the manufacture of a wide range of products requiring relatively strong but inexpensive sheet material which has the ability to absorb liquid media such as inks, water based adhesives, oils, etc. Such materials find use as label stock, envelopes, especially courier envelopes, oil-filled electrical capacitors as well as numerous other applications.

Extruded polymer films whether of the mono-layer or multi-layer (i.e., laminate) type have received little attention as materials for the construction of such products due primarily to the non-absorbent character of their surfaces. While resin films can be made to exhibit exceptional strength and at a cost which is competitive with paper and other types of fibrous sheet materials, their inability to absorb liquid media such as those aforementioned precludes their use in the manufacture of products where liquid absorbency is an essential functional requirement.

U.S. Pat. No. 4,377,616, the contents of which are incorporated by reference herein, discloses an opaque biaxially oriented polymer film structure comprising a thermoplastic polymer matrix core layer possessing numerous voids, a substantial number of which contain at least one spherical void-initiating particle, and transparent thermoplastic skin layers adhering to both major surfaces of the core layer. The unique structure of the core layer imparts a much higher degree of opacity, possibly due to the effects of light scattering, than that possible by the use of opaquing pigment alone. However, in this arrangement, the application of skin layers which are essentially non-absorbent to both major surfaces of the core layer which, due to the presence of numerous voids therein, exhibits absorbency for liquid media, prevents the absorbent capability of the core layer from being effectively utilized or exploited

SUMMARY OF THE INVENTION

It is an object of the present invention to provide a low-cost, high strength, opaque polymeric film laminate possessing at least one major surface which exhibits appreciable absorbency for liquid media such as water based adhesives, oil, organic solvent and water-based inks, oils utilized in the manufacture of electrical capacitors, and the like.

It is another object of this invention to provide an oriented polymer film laminate possessing at least one surface-exposed (i.e., outer) opaque, void-containing layer the composition and structure of which corresponds to the composition and structure of the opaque, void-containing core layer of the polymer film laminate described in U.S. Pat. No. 4,377,616.

It is still a further object of this invention to treat the exposed surface of the outer opaque, void-containing layer, and/or to incorporate one or more materials into said layer, to further enhance its absorbency for liquid.

In accordance with the foregoing objects, there is provided an oriented, opaque polymer film laminate which comprises:

(a) a non-absorbent thermoplastic polymer core layer having an upper major surface and a lower major surface; and, (b) a liquid absorbent, opaque surface layer adherently applied to the upper major surface of the core layer and, optionally, to the lower major surface of the core layer, said surface layer comprising a thermoplastic matrix polymer containing numerous opaquing voids, said voids containing one or more void-initiating particles derived from a material which is phase distinct from, and incompatible with, the matrix material.

The foregoing film laminate is prepared by the process which comprises:

(a) providing a non-absorbent thermoplastic core layer having an upper major surface and a lower major surface;

(b) providing a liquid-absorbent surface layer by:

(i) mixing a thermoplastic matrix polymer material with a void-initiating material which is phase distinct from, and incompatible with, the matrix polymer material and which possesses a melting point or glass transition temperature which is higher than the melting point or glass transition temperature of the matrix polymer material, (ii) heating the mixture of matrix polymer material and void-initiating material to a temperature which is at or above the melting point of the matrix polymer material, (iii) distributing the void-initiating material throughout the molten matrix polymer material in the form of micro particles, and (iv) forming the microparticle-containing matrix polymer material into said surface layer;

(c) adherently applying the surface layer to the upper major surface of the core layer and, optionally, to the lower major surface of the core layer, to provide a polymer film laminate; and, (d) biaxially orienting the polymer film laminate to form numerous opaquing voids in the surface layer(s) thereof, said opaquing voids imparting liquid-absorbency to said surface layer(s).

The ability of the polymer film laminate of this invention to absorb liquids can be further improved by treating the exposed surface of the opaque, void-containing layer(s) by a variety of conventional means, e.g., corona discharge, and/or by incorporating absorbent materials, e.g., distomaceous earth, vermiculite, etc., in said layer(s). The polymer film laminates, with or without such enhanced liquid absorbent capability, are well-suited for the manufacture of label stock, packaging materials, envelopes, electrical condensors and, in general, for any and all applications where cellulosic and non-cellulosic fibrous webs are currently being utilized for their liquid absorbent properties.

DESCRIPTION OF THE PREFERRED EMBODIMENTS

The non-absorbent thermoplastic core layer(a) can be fabricated from a wide variety of orientable, extrudable resins and resin blends including the polyolefins such as polyethylene homopolymer and copolymer, polypropylene homopolymer and copolymer, the polybutylenes and the ethylene-propylene-butylene terpolymers;

the polyvinyl halides and polyvinylidene halides, in particular, polyvinyl chloride and polyvinylidene chloride; the halogenated polyolefins such as polychlorethylene; polyesters such as ethylene-vinyl acetate copolymer, ethylene-vinyl acetate-vinyl alcohol terpolymer, polyethylene terephthalate and polybutylene terephthalate; the polyamides; compatible or compatibilized blends of two or more of the foregoing such as a homogeneous blend of from about 30 to about 90 weight parts of polypropylene and, correspondingly, about 70 to about 10 weight parts of polybutylene-1, and the like. Isotactic polypropylene of high isotactic content, e.g., of at least about 93% and preferably about 97 to 100% isotactic content, are advantageously employed as the polymer of core layer(a). Known and conventional extrusion equipment and techniques are contemplated for forming the thermoplastic material into core layer(a).

Surface layer(s)(b) can be formed from the same varieties of thermoplastic materials used to provide core layer (a) and like the latter, is/are advantageously provided as extrudate(s) of isotactic polypropylene.

In general, core layer (a) can constitute from about 15 to about 70 percent of the thickness of the laminate structure prior to orientation with surface layer(s)(b) constituting the balance, i.e., from about 85 to about 30 percent of the thickness of the laminate.

It is preferred that the average diameter of the void-initiating particles be from about 0.1 to about 10 microns. These particles are preferably approximately spherical in shape so as to initiate a void of fairly uniform geometry and orientation throughout the thermoplastic polymer matrix material following biaxial orientation of the laminate. The size of the void-initiating particles, and consequently, the size of the voids resulting upon orientation, need not be uniform. However, the voids will tend to be of similar shape when their formation is initiated by approximately spheroidal particles which is the preferred geometric configuration for the void-initiating particles. When spheroidal void-initiating particles are employed, the resulting voids will tend to take on an appearance which can be described as two opposed concave disks whose edges are in mutual contact. Optimum characteristics of opacity are obtained when the two average major void dimensions are greater than about 30 microns.

The void-initiating particle material must be incompatible with the polymer matrix component of the surface layer at least at the temperature of biaxial orientation. When formed, the voids will, for the most part, assume an orientation such that the two major dimensions are aligned in substantially the same direction as the orientation of the overall film structure. Once the voids have formed, the void-initiating particles may function in no other capacity as far as the properties of the finished laminate product are concerned. This is particularly the case where the refractive index of the void-initiating particles is close enough to that of the polymer matrix material that the former makes no significant contribution to opacity. In such a case, opacity is believed to be principally a function of the light-scattering effect which occurs due to the presence of the voids in the surface layer(s). The opacity of the surface layer(s) can be somewhat enhanced by the uniform inclusion therein of an opaquing pigment. A particularly preferred proportion of pigment in surface layer(s) (b) can be from about 1 to about 3% by weight of said layer(s). The pigment material should ordinarily be of such a particle size and shape that it will not participate in void initiation to any significant extent. The optional presence of opaquing pigment contributes perhaps 3 to 8% to the overall degree of opacity of the surface layer(s).

A typical void can be defined as having major dimensions X and Y and minor dimension Z where dimension X is aligned with machine direction orientation, dimension Y is aligned with transverse direction orientation and dimension Z corresponds approximately to the cross-sectional dimension of the particle which initiates the void. The orientation conditions will generally be such that the X and Y dimensions of the voids will be the major dimensions compared to the Z dimension. Thus, while the Z dimension generally approximates the cross-sectional dimension of the void-initiating particle, the X and Y dimensions will ordinarily be significantly greater. In addition, the orientation conditions will be such as to maintain the integrity of the majority of the voids once the latter are formed. By this, it is meant that during the orientation which results in the X and Y dimensions, that is, during simultaneous or sequential machine direction and transverse direction stretching, the selected temperature conditions will permit these major dimensions to be obtained without excessive destruction of voids in any of their dimensions. The voids are particularly vulnerable to destruction during sequential orientation if the stretching forces are such as to cause internal shredding and/or void splitting. This can lead to a complete loss of control over the integrity of the individual voids and the consequent integrity of the surface layer(s). Following the present general guidelines, one can orient at a temperature and to a degree which will yield X and Y dimensions approaching the maximum without causing an unacceptable degree of splitting, shredding or overall lack of void integrity.

By way of illustration, ambient temperature biaxial orientation of polypropylene surface layer(s) (b) containing spheroidal nylon void-initiating particles of a size and in an amount contemplated herein will not provide the laminate of this invention since such an orientation temperature will result in a considerable amount of void splitting and/or voids of insignificant size. The polypropylene must be oriented at a temperature which is significantly greater than its glass transition temperature. The selected temperature conditions must permit the X and Y dimensions to be at least several multiples of the Z dimension without at the same time causing an excessive amount of void splitting. If this requirement is observed, optimum physical characteristics, including a high degree of light scattering, will be obtained without an excessive incidence of void splitting and/or film fibrillation.

It is to be noted, however, that some minor amount of void splitting or fibrillation can be tolerated and, indeed, may even be advantageous to the extent it enhances the absorbency of the final film product. The amount of void splitting or fibrillation which will confer such increased absorbency without appreciably impairing the opaque, lustrous appearance or other desirable characteristics of the film can be readily determined for a particular case employing routine experimentation.

As previously indicated, the matrix polymer material and the void-initiating particle material must be incompatible in the sense that these two materials when combined will constitute two distinct phases. The void-initiating particles will be present in the surface layer(s) as a dispersed phase within the lower melting matrix polymer which polymer will, upon orientation, become a void-filled layer with the void-initiating particles retained somewhere within the voids.

Biaxial orientation of the film laminate results not only in the formation of opaquing voids in the surface layer(s) of the structure and imparts liquid-absorbency thereto, it improves other physical properties of the laminate such as flex-cracking resistance, Elmendorff tear strength, elongation, tensile strength, impact strength and cold strength.

The void-initiating particle material can be organic or inorganic. Thermoplastic resins which can be used to provide the void-initiating particles include the polyamides, certain polyesters such as the polyethylene terephthalate acetals, acrylic resins, etc. Inorganic materials include solid or hollow pre-formed glass, metal or ceramic spheres, beads, etc.

When a thermoplastic polymeric is contemplated as the material for the void-initiating particles, it can be one which is co-meltable with the matrix polymer. In such case, it is necessary that the polymer of the void-initiating particles have a higher melting point than that of the matrix polymer, that it be incompatible with the matrix polymer and that it be capable of assuming a dispersed phase of micro-dimensioned, preferably spheroidal, particles in the matrix polymer as the temperature of the co-melt is reduced.

It is also within the scope of this invention to employ pre-formed void-initiating particles which are substantially uniformly dispersed within the molten matrix polymer. When pre-formed void-initiating particles are employed, it is the shape and size of the particles that are important rather than their chemical properties. Thus, solid or hollow organic or inorganic particles, preferably spheroidal in shape, of any type can be employed. Interesting and aesthetically attractive color and/or reflection effects can be imparted to the surface layer(s) of the laminate by incorporating spheres of different color absorption or reflectance therein. The light scattered in a particular void is additionally either absorbed or reflected by the void-initiating particle and a separate color contribution is made to the light scattering in each void.

While the average particle size of the void-initiating particles can vary over a wide range, e.g., from about 0.1 to about 10 microns, it is preferred that the particle size range from about 0.75 to about 2 microns. The void initiating particles can be present in up to about 20% by weight of surface layer(s)(b) prior to orientation, a preferred range being from about 2 to about 7 percent by weight of the layer(s).

For convenience and for more precise control of the formulation and characteristics of the surface layer(s), a master batch technique can be employed either in the case of forming the void-initiating particles in situ or in adding pre-formed particles to the molten matrix polymer. After formation of a master batch, its dilution can be accomplished by adding additional matrix polymer until the desired proportions are obtained.

Additives, such as fillers, antioxidants, pigments, antistatic agents, slip agents, antitack agents, absorbents, and the like, in the customary amounts can be incorporated into the polymer materials constituting core layer(a) and/or surface layer(s)(b) as desired. Alternatively or in addition to the foregoing, the exposed surface of the surface layer(s) can be treated in any of several known and conventional ways to enhance liquid-retaining capacity as, for example, film chlorination, i.e., exposure of the film surface to gaseous chlorine, treatment with oxidizing agents such as chromic acid, hot air or steam treatment, flame treatment, and the like. Although any of these techniques can be employed to treat the surface layer(s), a particularly desirable method of treatment is the so-called electronic treatment method in which the film is exposed to a high voltage corona discharge while passing between a pair of spaced electrodes. After electronic treatment of the film surface, the coating composition is then applied thereto.

Increased absorbency for liquid can also be achieved by addition to the surface layer(s) of minor amounts of inorganic or organic fillers of relatively large average particle size, e.g., from about 1 to about 15 microns as measured along the greatest dimension. Thus, the addition of from about 1 to about 5 weight percent of such particles by weight of the surface layer(s) generally results in a readily apparent increase in the absorbency of the surface layer(s). The filler particles can be generally spherical or irregular in shape or they can be provided as particles having fairly high length to diameter ratios, i.e., rods, fibers or filaments. Fiber-like filler particles, due to their ability to interpenetrate individual voids lying within their paths and thereby open up the voids for enhanced liquid absorbency, can be especially advantageous. Suitable fibrous filler particles include commercially available wood and cellulosic filaments of appropriate size.

It is preferred that the materials constituting the core and surface layers be coextruded to provide the film laminate herein, biaxial orientation thereafter being carried out to an extent and at a temperature intended to provide maximum opacity without any significant sacrifice in the physical characteristics of the overall structure. Obviously, for different materials, the conditions of biaxial orientation will be different. By way of exemplification, when employing a polypropylene as the core polymer and as the matrix polymer and nylon-6 microspheres as the void-initiating particles, a machine direction orientation of from about 4 to 8 times and a transverse direction orientation of from about 4 to 8 times at a drawing temperature of from 100° C. to 160° C. can be used to provide a biaxially oriented opaque film of from 0.7 to 3 mils overall thickness.

The following example is illustrative of the process by which film laminate of this invention can be obtained.

EXAMPLE

Isotactic polypropylene is melted in a first extruder at 190°–220° C. and extruded to provide a core layer (a). Simultaneously, the same isotactic polypropylene containing 7 weight parts of pre-formed spherical nylon-6 void-initiating particles of an average particle size of about 0.75 to 2 microns and a melting point of about 225° C. is melt-blended at about 200° C. with the extrudate being coextensively applied to the upper and lower surfaces of core layer (a) as surface layers ($b_1$) and ($b_2$). The core layer of the resulting film laminate constitutes about 40 of the total thickness of the structure with surface layers ($b_1$) and ($b_2$) each making up 30 percent of the thickness. The unoriented film laminate measures approximately 40 mils in total thickness. The film is subsequently oriented seven by seven and one-half times using a commercially available sequential biaxially orienting apparatus. The MD orientation temperature is about 105° C. and the TD orientation is about 135° C. The resulting 1.9 mil film laminate has an opaque appearance and the exposed surfaces of layers (b₁) and (b₂) have significant liquid absorbent capability.

What is claimed is:

1. An oriented, opaque polymer film laminate which comprises:
   (a) a non-absorbent thermoplastic polymer core layer having an upper major surface and a lower major surface; and,
   (b) a liquid-absorbent, opaque surface layer adherently applied to the upper major surface of the core layer and, optionally, to the lower major surface of the core layer, said surface layer comprising a thermoplastic matrix polymer containing numerous opaquing voids, said voids containing one or more void-intiating particles derives from a material which is phase distinct from, and incompatible with, the matrix material, there being present in said surface layer filler particles having a particle size from about 1 to about 15 microns as measured along the greatest dimension, said particles increasing the absorbency of surface layer(s).

2. The polymer film laminate of claim 1 wherein the polymer of core layer (a) is an isotactic polypropylene.

3. The polymer film laminate of claim 1 wherein the matrix polymer of surface layer(s)(b) is an isotactic polypropylene.

4. The polymer film laminate of claim 2 wherein the the matrix polymer of surface layer(s)(b) is an isotactic polypropylene.

5. The polymer film laminate of claim 1 wherein the void-initiating particles are spheroidal in shape, range in average size of from bout 0.1 to about 10 microns and are derived from inorganic or organic material 6. The polymer film laminate of claim 5 wherein the spheroidal void-initiating particles are pre-formed and are derived from an inorganic material.

7. The polymer film laminate of claim 6 wherein the pre-formed, spheroidal, inorganic void-initiating particles are solid or hollow glass, ceramic or metal spheres or beads.

8. The polymer film laminate of claim 5 wherein the spheroidal void-initiating particles are pre-formed or formed in situ and are derived from an organic polymer material.

9. The polymer film laminate of claim 8 wherein the organic polymer material is a polyamide.

10. The polymer film of claim 1 wherein the film is coextruded and biaxially oriented, the polymer of the core layer is isotactic polypropylene, the thermoplastic matrix polymer of surface layer(s) is isotactic polypropylene and the void-initiating particles are spheroidal in shape, range in average size of from about 0.1 to about 10 microns and are derived from a polyamide.

11. The polymer film of claim 1 wherein a liquid is absorbed on the exposed surface of a surface layer.

12. The polymer film of claim 11 wherein said liquid contains water, an oil, a water soluble component, an oil soluble component or mixture of two or more of the foregoing.

13. The polymer film of claim 12 wherein said liquid is a solution, suspension, emulsion, dispersion or latex.

14. The polymer film of claim 13 wherein said liquid is a water based adhesive or ink.

15. A process for producing an oriented, opaque polymer film laminate which comprises:
   (a) providing a non-absorbent thermoplastic core layer having an upper major surface and lower major surface;
   (b) providing a surface layer by:
      (i) mixing a thermoplastic matrix polymer material with a void-initiating material which is phase distinct from, and incompatible with, the matrix polymer material and which possesses a melting point or glass transition temperature which is higher than the melting point or glass transition temperature of the matrix polymer material,
      (ii) heating the mixture of matrix polymer material and void-initiating material to a temperature which is at or above the melting point of the matrix polymer material,
      (iii) distributing the void-initiating material throughout the molten matrix polymer material in the form of microparticles, and
      (iv) forming the microparticle-containing matrix polymer material into said surface layer;
   (c) adherently applying the surface layer to the upper major surface of the core layer and, optionally, to the lower major surface of the core layer, to provide a polymer film laminate; and,
   (d) biaxially orienting the polymer film laminate at a temperature which is signifiantly greater than the glass transition temperature of the thermoplastic polymer matrix material of the surface layer, to form numerous opaquing voids in the surface layer(s) thereof, at least a portion of said voids becoming open during orienting so as to impart liquid-absorbent capability to the surfae layer(s).

16. The process of claim 15 wherein the polymer of core layer (a) is an isotactic polypropylene.

17. The process of claim 15 wherein the matrix polymer of surface layer(s)(b) is an isotactic polypropylene.

18. The process of claim 16 wherein the matrix polymer of surface layer(s)(b) is an isotactic polypropylene.

19. The process of claim 15 wherein the void-initiating particles are spheroidal in shape, range in average size of from about 0.1 to about 10 microns and are derived from inorganic or organic material.

20. The process of claim 19 wherein the spheroidal void-initiating particles are pre-formed and are derived from an inorganic material.

21. The process of claim 20 wherein the pre-formed, spheroidal, inorganic void-initiating particles are solid or hollow glass, ceramic or metal spheres or beads.

22. The process of claim 19 wherein the spheroidal void-initiating particles are pre-formed or formed in situ and are derived from an organic polymer material.

23. The process of claim 22 wherein the organic polymer material is a polyamide.

24. The process of claim 15 wherein the conditions of step (d) are such that a minor amount of void splitting and/or fibrillation providing enhanced absorbency results.

25. The polymer film of claim 15 wherein the film is coextruded and biaxially oriented, the polymer of the core layer is isotactic polypropylene, the thermoplastic matrix polymer of surface layer(s) is isotactic polypropylene and the void-initiating particles are spheroidal in shape, range in average size of from about 0.1 to about 10 microns and are derived from a polyamide.

26. The process of claim 15 wherein a liquid is absorbed on the exposed surface of a surface layer.

27. The process of claim 26 wherein said liquid contains water, an oil, a water soluble component, an oil soluble component or mixture of two or more of the foregoing.

28. The process of claim 27 wherein said liquid is a solution, suspension, emulsion, dispersion or latex.

29. The process of claim 28 wherein said liquid is a water based adhesive or ink.

30. An oreinted, opaque polymer film laminate which comprises:
   (a) a non-absorbent thermoplastic polymer core layer having an upper major surface and a lower major surface; and,
   (b) a liquid-absorbent, opaque surface layer adherently applied to the upper major surface of the core layer, and optionally, to the lower major surface of the core layer, said surface layer comprising a thermoplastic matrix polymer containing numerous opaquing voids, said voids containing one or more void-initiating particles derived from a material which is phase distinct from, and incompatible with, the matrix material, there being present in said surface layer filler particles provided as rods, fibers or filaments which increase the absorbency of the surface layers.

31. A process for producing an oriented, opaque polymer film laminate which comprises:
   (a) providing a non-absorbent thermoplastic core layer having an upper major surface and lower major surface;
   (b) providing a surface layer by:
      (i) mixing a thermoplastic matrix polymer material with a void-initiating material which is phase distinct from, and incompatible with, the matrix polymer material and which possesses a melting point or glass transition temperature which is higher than the melting point or glass transition temperature of the matrix polymer material,
      (ii) heating the mixture of matrix polymer material and void-initiating material to a temperature which is at or above the melting point of the matrix polymer material,
      (iii) distributing the void-initiating material throughout the molten matrix polymer material in the form of microparticles, and
      (iv) forming the microparticle-containing matrix polymer material into said surface layer;
   said surface including a minor amount of filler particles provided as rods, fibers or filaments, to enhance the absorbency of said surface layer(s);
   (c) adherently applying the surface layer to the upper major surface of the core layer and, optionally, to the lower major surface of the core layer, to provide a polymer film laminate; and,
   (d) biaxially orienting the polymer film laminate under selected temperature conditions to avoid excessive incidence of void splitting and/or film fibrillation, to form numerous opaquing voids in the surface layer(s) thereof, at least a portion of said voids becoming open during orienting so as to impart liquid-absorbent capability to the surface layer(s).

* * * * *